(12) United States Patent
Cipollo et al.

(10) Patent No.: US 8,914,724 B2
(45) Date of Patent: Dec. 16, 2014

(54) METHOD AND APPARATUS FOR CREATING AND MODIFYING GRAPHICAL SCHEDULES

(75) Inventors: Nicholas J. Cipollo, Boston, MA (US); Michael C. Silva, East Sandwich, MA (US); Timothy R. Locascio, Osterville, MA (US)

(73) Assignee: Savant Systems, LLC, Hyannis, MA (US)

( * ) Notice: Subject to any disclaimer, the term of this patent is extended or adjusted under 35 U.S.C. 154(b) by 679 days.

(21) Appl. No.: 13/081,183

(22) Filed: Apr. 6, 2011

(65) Prior Publication Data

US 2012/0260166 A1 Oct. 11, 2012

(51) Int. Cl.
*H04N 21/47* (2011.01)
*G06F 3/0486* (2013.01)
*G06F 3/0484* (2013.01)
*G06F 3/0488* (2013.01)

(52) U.S. Cl.
CPC .......... *G06F 3/04883* (2013.01); *G06F 3/0486* (2013.01); *G06F 3/04847* (2013.01)
USPC ........... 715/716; 715/771; 715/772; 715/764; 700/1; 700/17; 700/19

(58) Field of Classification Search
CPC .................................. G06F 8/20; H04N 21/47
USPC ........................................................ 715/716
See application file for complete search history.

(56) References Cited

U.S. PATENT DOCUMENTS

| | | | | |
|---|---|---|---|---|
| 5,566,084 A | * | 10/1996 | Cmar | 700/276 |
| 6,067,482 A | * | 5/2000 | Shapiro | 700/286 |
| 6,160,359 A | * | 12/2000 | Fleischmann | 315/294 |
| 6,366,889 B1 | * | 4/2002 | Zaloom | 705/7.37 |
| 6,756,998 B1 | * | 6/2004 | Bilger | 715/764 |
| 7,047,092 B2 | * | 5/2006 | Wimsatt | 700/83 |
| 7,142,948 B2 | * | 11/2006 | Metz | 700/276 |
| 7,167,777 B2 | * | 1/2007 | Budike, Jr. | 700/297 |
| 7,181,317 B2 | * | 2/2007 | Amundson et al. | 700/276 |
| 7,360,717 B2 | * | 4/2008 | Shah | 236/46 R |
| 7,603,200 B2 | * | 10/2009 | Bader et al. | 700/245 |

(Continued)

FOREIGN PATENT DOCUMENTS

JP 2009/275928 11/2009

OTHER PUBLICATIONS

"Notification of Transmittal of the International Search Report and the Written Opinion of the International Searching Authority, or the Declaration," International Filing Date: Apr. 5, 2012, International Application No. PCT/US2012/000191, Applicant: SAVANT SYSTEMS, LLC., Date of Mailing: Aug. 28, 2012, pp. 1-13.

(Continued)

*Primary Examiner* — William Bashore
*Assistant Examiner* — Reza Nabi
(74) *Attorney, Agent, or Firm* — Cesari and McKenna, LLP

(57) ABSTRACT

A graphical user interface enables a user to create and modify graphical schedules for a wide variety of devices that may be controlled by a programmable multimedia controller. A graphical schedule graphically depicts a relationship between time and at least one user-selected condition to be satisfied or at least one user-selected action to be taken. The user may create or modify graphical schedules using familiar techniques such as taps and swipes, drag and drop and the like.

21 Claims, 8 Drawing Sheets

(56) References Cited

U.S. PATENT DOCUMENTS

| | | | |
|---|---|---|---|
| 7,890,195 B2* | 2/2011 | Bergman et al. | 700/17 |
| 8,296,669 B2* | 10/2012 | Madonna et al. | 715/765 |
| 2003/0016247 A1* | 1/2003 | Lai et al. | 345/764 |
| 2003/0110926 A1* | 6/2003 | Sitrick et al. | 84/477 R |
| 2004/0138981 A1* | 7/2004 | Ehlers et al. | 705/36 |
| 2005/0149233 A1* | 7/2005 | Metz | 700/276 |
| 2006/0288842 A1* | 12/2006 | Sitrick et al. | 84/477 R |
| 2007/0092229 A1* | 4/2007 | Ninomiya | 386/126 |
| 2007/0198099 A9* | 8/2007 | Shah | 700/1 |
| 2008/0019610 A1* | 1/2008 | Matsuzaka et al. | 382/284 |
| 2008/0079604 A1* | 4/2008 | Madonna et al. | 340/825.72 |
| 2008/0127063 A1* | 5/2008 | Silva et al. | 717/107 |
| 2008/0158148 A1* | 7/2008 | Madonna et al. | 345/156 |
| 2008/0270937 A1* | 10/2008 | Poulet et al. | 715/810 |
| 2008/0306632 A1* | 12/2008 | Miki et al. | 700/276 |
| 2010/0023865 A1* | 1/2010 | Fulker et al. | 715/734 |
| 2010/0162160 A1* | 6/2010 | Stallings et al. | 715/784 |
| 2010/0312366 A1* | 12/2010 | Madonna et al. | 700/90 |
| 2011/0004825 A1* | 1/2011 | Wallaert | 715/702 |
| 2011/0083094 A1* | 4/2011 | Laycock et al. | 715/772 |
| 2011/0167348 A1* | 7/2011 | Silva et al. | 715/716 |
| 2011/0184565 A1* | 7/2011 | Peterson | 700/278 |
| 2011/0219339 A1* | 9/2011 | Densham | 715/849 |
| 2011/0320044 A1* | 12/2011 | Smith et al. | 700/276 |
| 2012/0081750 A1* | 4/2012 | Shibamiya et al. | 358/1.15 |
| 2012/0185801 A1* | 7/2012 | Madonna et al. | 715/834 |
| 2012/0260206 A1* | 10/2012 | Cipollo et al. | 715/771 |
| 2012/0284672 A1* | 11/2012 | Madonna et al. | 715/850 |

OTHER PUBLICATIONS

Meliones, A., et al., "A Context Aware Connected Home Platform for Pervasive Applications," 2008 Second IEEE International Conference on Self-Adaptive and Self-Organizing Systems Workshops, IEEE Computer Society, Oct. 20, 2008, pp. 120-125.

U.S. Appl. No. 11/687,511 entitled System and Method for Mixing Graphics with video images or Other Content filed on Mar. 16, 2007 by Robert P. Madonna, 31 pages.

* cited by examiner

METHOD AND APPARATUS FOR CREATING AND MODIFYING GRAPHICAL SCHEDULES

BACKGROUND OF THE INVENTION

1. Field of the Invention

The present invention relates generally to schedulers and, more specifically, to creating and modifying graphical schedules which are associated with devices that are controlled by a programmable multimedia controller.

2. Background Information

In recent years, both commercial and home automation solutions have advanced rapidly in terms of features and capabilities while falling in price. Prior solutions that required extensive custom programming and expensive, proprietary touchpanels for user input devices have been challenged and displaced by new solutions with open application programming interfaces and inexpensive user input devices such as multi-touch smartphones and tablets.

As automation solutions have advanced and evolved, so too have the number and variety of devices that users may own and wish to integrate into an automation solution. As more devices having increasingly diverse features and functionalities become available, a problem has arisen: how to reliably instruct an automation system to perform desired functions or take certain actions at desired times. Stated another way, in the area of automation solutions, there exists a need for a simple, intuitive, easily installed and inexpensive way to create and maintain schedules for the performance of desired functions and actions by a wide variety of devices and equipment.

SUMMARY OF THE INVENTION

In brief summary, the present invention provides a graphical user interface which enables a user to create graphical schedules, as well as modify existing graphical schedules, for a wide variety of devices controlled by a programmable multimedia controller. When displayed to the user, a graphical schedule graphically depicts a relationship between time and at least one user-selected condition to be satisfied (e.g., a minimum temperature to be maintained in a home during evening hours) or at least one user-selected action to be taken (e.g., turning on a sprinkler system at noon). Depending upon the user's data input device, the user may easily create or modify a graphical schedule by graphically manipulating the time-based relationship using techniques such as taps and swipes, drag and drop, point and click, or other techniques.

In addition, a user may create and modify presets which are associated with a graphical schedule. One type of preset represents a user-selected environmental state for a predetermined physical space. For example, a user may create a preset for a family room in a home in which, at a predetermined time, certain light fixtures are turned on, a television is turned on and tuned to a particular channel, and the motorized shades are closed. Presets may be created for single rooms or multi-room zones within a structure, or for the structure as a whole, and may address one or multiple devices controlled by a programmable multimedia controller.

The graphical user interface may be presented to a user using any of a variety of devices including touch-sensitive devices, an on screen display, or a conventional video display in which user input is made through a keyboard or mouse.

BRIEF DESCRIPTION OF THE DRAWINGS

The invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
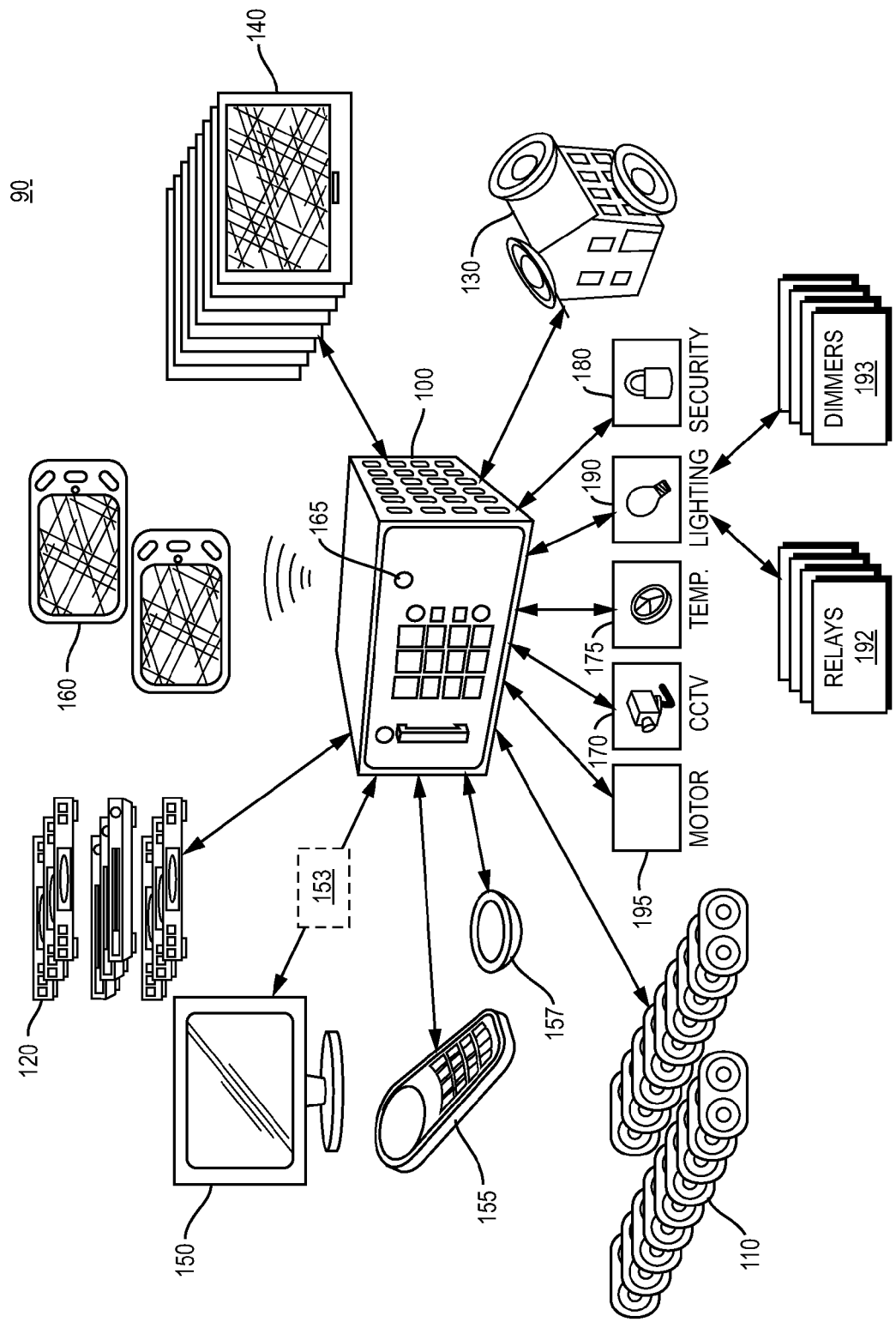
FIG. 1 is a block diagram of a system which includes a programmable multimedia controller interconnected with a variety of devices that may be controlled by the controller.

FIG. 1 is a block diagram of a system 90 which includes a programmable multimedia controller 100 interconnected to a number of devices. The term "programmable multimedia controller" should be interpreted broadly as a device which includes a general purpose computer and is capable of controlling, switching data among, and/or otherwise interoperating with a variety of electrical and electronic devices, such as audio, video, telephony, data, security, motor-operated, relay-operated, heating, ventilation, and air conditioning (HVAC), energy management and/or other types of devices. A line of programmable multimedia controllers are available from Savant Systems, LLC of Osterville, Mass.

Programmable multimedia controller 100 may be coupled to or interfaced with a variety of A/V devices, including audio source devices 110, such as compact disk (CD) players, digital video disc (DVD) players, microphones, digital video recorders (DVRs), cable boxes, audio/video receivers, personal media players, and other devices that source audio signals. Programmable multimedia controller 100 may also be coupled to or interfaced with a variety of video source devices 120, such as DVD players, DVRs, personal media players and other devices that source video signals. Programmable multimedia controller 100 may be coupled to or interfaced with a variety of audio output devices 130, such as speakers, devices that incorporate speakers, and other devices that output audio, as well as a variety of video output devices 140, such as televisions, monitors, and other devices that output video.

Further, programmable multimedia controller 100 may be coupled to or interface with, control, and otherwise interoperate with a variety of other types of devices, either directly, or through one or more intermediate controllers. For example, programmable multimedia controller 100 may be coupled to a closed-circuit television (CCTV) control system 170 that manages a system of cameras positioned about a home or other structure, HVAC control and/or energy management system 175 that manages HVAC devices to regulate environmental functions and/or energy management devices in the home or other structure, and/or a security system 180 that manages a plurality of individual security sensors in the home or other structure. In response to control commands received from programmable multimedia controller 100, CCTV control system 170, HVAC control system and/or energy management system 175, and security system 180 may manage the devices under their respective immediate control.

Further, programmable multimedia controller 100 may be coupled to or interface with, control, and otherwise interoperate with, one or more electronic lighting controllers 190. Electronic lighting controllers 190 may be coupled to, for example, via wired or wireless links, a plurality of relays 192 and/or dimmer units 193 distributed throughout the home or other structure, and wired inline with the electrical feed to individual light fixtures located therein. In response to control commands received from programmable multimedia controller 100, electronic lighting controllers 190 may selectively trigger relays 192 and/or adjust dimmer units 193 wired inline to particular light fixtures (not shown), to create a desired level of illumination or darkness in different rooms of the home or other structure.

Similarly, programmable multimedia controller 100 may be coupled to or interfaced with, control, and otherwise interoperate with, one or more motor operated device controllers 195, for example, one or more automatic window shade controllers, or other types of controllers. As with lighting control, in response to control commands received from programmable multimedia controller 100, motor-operated device controllers 195 may selectively trigger motor-operated devices (not shown) in various rooms of the home or other structure, to achieve desired effects.

Programmable multimedia controller 100 may receive user-input via one or more control units 150, for example, wall-mounted control units, table-top control units, handheld portable control units, and the like, that include a display screen. Control units 150 may include a touch screen interface, a mouse and pointer interface, or other type of interface. Control units 150 may be special-purpose units, dedicated to operating with programmable multimedia controller 100, or general-purpose devices, for example, laptop computers, desktop computers, and the like, configured with software to implement a user interface. In some cases, control units 150 may be coupled to programmable multimedia controller 100 via an intermediate device 153, such a computer, via a wired or wireless connections or networks. In other cases, control units 150 may communicate directly to programmable multimedia controller 100.

Programmable multimedia controller 100 may also receive user-input via one or more handheld button-centric remote control units and/or wall mounted button-centric control units 155, or from one or more handheld remote control units including an annular touch sensor 157. Remote control units including annular touch sensor 157 may be adapted to manipulate, and make control selections using, an on-screen display (OSD) system. Further details regarding remote control units, including an annular touch sensor, and an OSD may be found in copending applications by Madonna et al., U.S. patent application Ser. No. 11/520,328, filed Sep. 13, 2006 and titled "Remote Control Unit for a Programmable Multimedia Controller," U.S. patent application Ser. No. 11/687, 511, filed Mar. 16, 2007 and titled "System and Method for Mixing Graphics with Video Images or Other Content," and U.S. patent application Ser. No. 11/687,458, filed Mar. 16, 2007 and titled "Programmable On Screen Display and Remote Control," all of which are incorporated by reference herein in their entireties.

Programmable multimedia controller 100 may also receive user-input via one or more mobile devices 160. As used herein, the term "mobile device" refers to electronic devices that are adapted to be transported on one's person, including multimedia smartphones, such as the iPhone® multimedia phone available from Apple Inc. and the Blackberry® device available from Research In Motion Limited, multi-purpose tablet computing devices, such as the iPad® tablet available from Apple Inc., portable media players with enhanced capabilities, such as the iPod® touch available from Apple Inc., personal digital assistants (PDAs), electronic book readers, and the like. Such mobile devices may communicate directly with programmable multimedia controller 100, or indirectly through various wireless, cellular, and/or wired networks (not shown).

Further, programmable multimedia controller 100 may receive user-input via a touch screen or other interface integrated into programmable controller multimedia 100 itself, for example, a touch screen or other interface arranged as a front panel 165 of programmable multimedia controller 100. Still further, programmable multimedia controller 100 may receive user-input via a touch screen integrated into a video output device 140, such as a television.

In response to user-input from any of control units 150, button-centric remote control units and/or wall mounted button-centric control units 155, remote control units including annular touch sensor 157, mobile devices 160, front panel 165 and/or video output devices 140, programmable multimedia controller 100 may switch data among, issue control commands to, and/or otherwise interoperate with, audio source devices 110, video source devices 120, audio output devices 130, and/or video output devices 140. Further, in response to the user-input, programmable multimedia controller 100 may issue control commands to, and otherwise interoperate with, CCTV control system 170, HVAC control and/or energy management system 175, security system 180, electronic lighting controllers 190, as well as motor operated device controllers 195.

Figure 2:
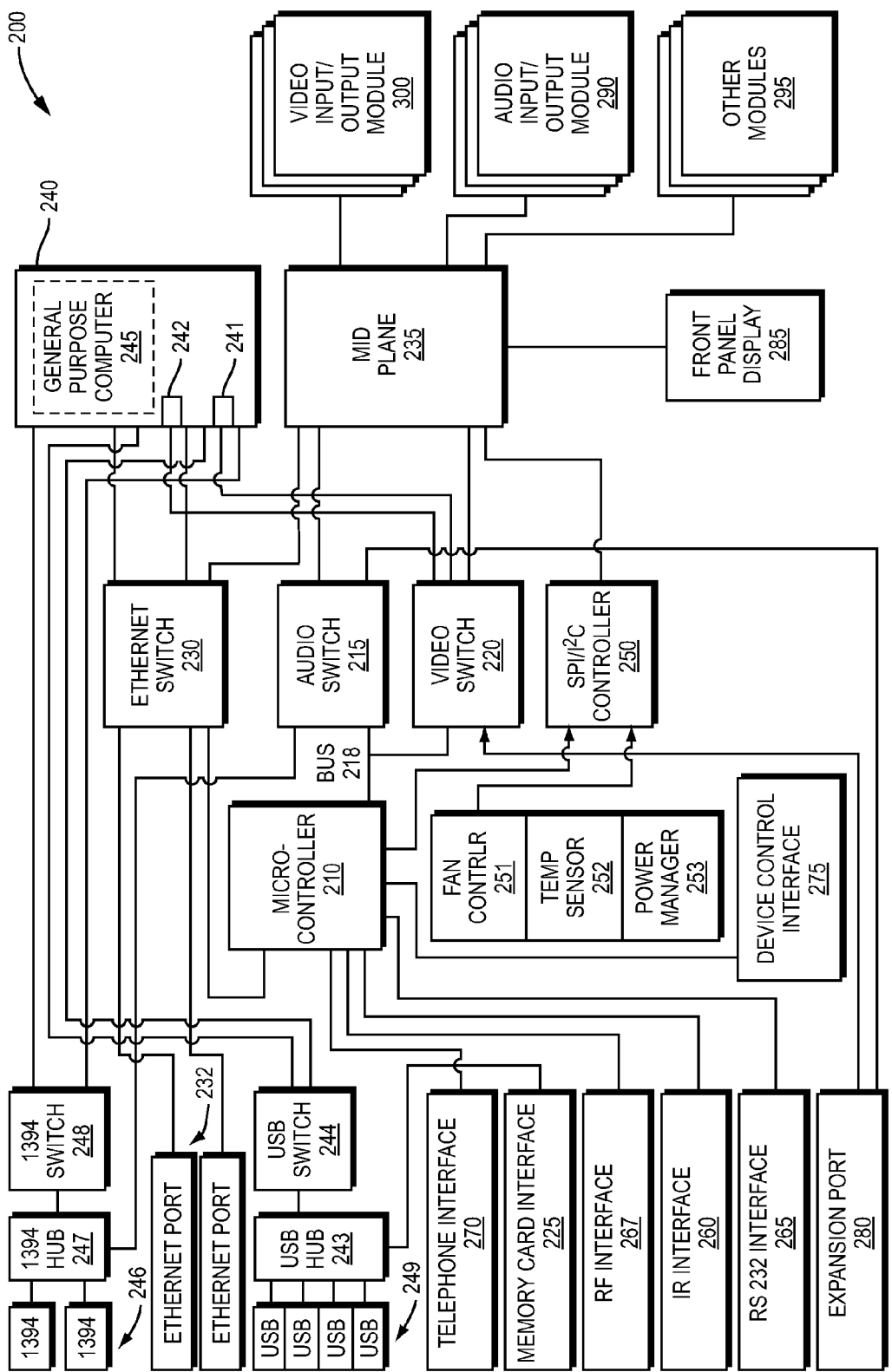
FIG. 2 is a high level block diagram of the hardware architecture of the programmable multimedia controller of FIG. 1.

FIG. 2 is a schematic block diagram of a high-level hardware architecture 200 for programmable multimedia controller 100. The various components shown may be arranged on a "motherboard" of programmable multimedia controller 100, or on a plurality of circuit cards interconnected by a backplane (not shown). A microcontroller 210 manages the general operation of programmable multimedia controller 100. Microcontroller 210, in some configurations, is coupled to an audio switch 215 and a video switch 220 via a bus 218. Audio switch 215 and video switch 220 are preferably crosspoint switches capable of switching a number of connections simultaneously. However, many other types of switches capable of switching digital signals may be employed, for example Time Division Multiplexing (TDM) switches or other devices. Further, while two separate switches 215, 220 are shown, audio and video switching may be consolidated into a single switch that supports switching of both types of data, or switches 215, 220 may not be present in some configurations.

A mid plane 235 interconnects audio and video switches 215, 220 to a variety of input and output modules, for example, one or more Video Input/Output Modules 300, one or more Audio Input/Output Modules 290, and/or one or more other modules 295. Mid plane 235 is further coupled to an Ethernet switch 230 that permits switching of 10BaseT, 100BaseT, Gigabyte Ethernet and/or other types of data signals. Ethernet switch 230 interconnects Ethernet ports 232 and a processing subsystem 240 to microcontroller 210.

In one embodiment, processing subsystem 240 includes one or more "general-purpose computers" 245. A general-purpose computer 245, as used herein, refers to a device that is configured to execute a set of instructions, and depending upon the particular instructions executed, may perform a variety of different functions or tasks. Typically, but not always, a general-purpose computer 245 executes a general-purpose operating system, such as the Windows® operating system, available from Microsoft Corporation, the Linux® operating system, available from a variety of vendors, the OSX® operating system, available from Apple Inc., or another operating system. A general-purpose computer 245 may have any of a variety of form factors. For example, a general-purpose computer 245 may be a Central Processing Unit (CPU) card, a Single Board Computer (SBC), a PC/104 processing module, a conventional ATX form factor motherboard and CPU, an "off-the-shelf" small form factor general-purpose personal computer including a case, power supply, and other accessories, an "off-the-shelf" large form factor general-purpose personal computer including a case, power supply, and other accessories, and/or a rack-mount general-purpose personal computer including a case, power supply, and other accessories. General-purpose computer 245 may include a storage device, for example a hard drive, a compact disc read-only memory (CDROM) drive, a Flash memory, or other type of storage device, and/or may be interconnected to a storage device provided elsewhere in the processing subsystem 240.

Processing subsystem 240 preferably has one or more graphics outputs 241, 242 such as analog Video Graphics Array (VGA) connectors, Digital Visual Interface (DVI) connectors, Apple Display Connector (ADC) connectors, or other type of connectors, for supplying graphics. Such graphics outputs 241, 242 may, for example, be supplied directly from the one or more general-purpose computers 245 of the processing subsystem 240. As used herein, the term "graphics" should be interpreted broadly to encompass a wide variety of computer graphics, text, full-motion video, still images, or other types of visual data, represented in any of a variety of different color spaces, for example RGB, YCrCb, and the like, at any of a variety of different color depths, for example 8-bit color, 16-bit color, 24-bit color, 32-bit color, and the like. Graphics from processing subsystem 240 are passed to video switch 220, in some configurations, and then switched to other parts of programmable multimedia controller 100, for example to Video Input/Output Modules 300. Alternately, graphics from processing subsystem 240, in some arrangements, may pass directly to a module, such as Video Input/Output Modules 300.

A number of Universal Serial Bus (USB) ports 249 interconnected to a USB hub 243. A memory card interface 225 is also connected to USB hub 243. The interface may accept one or more well-known memory card formats, for example CompactFlash™ cards, Memory Stick™ cards, Secure Digital™ (SD) cards, or other formats. A USB switch 244 is employed to switch USB links to processing subsystem 240. In a similar manner, a number of IEEE 1394 (FireWire™) ports 246 are interconnected to an IEEE 1394 hub 247 and to an IEEE 1394 switch 248, for switching to the processing subsystem 240.

Microcontroller 210 is further connected to a Serial Peripheral Interface (SPI) and Inter-Integrated Circuit (I²C) distribution circuit 250, which provides a serial communication interface to relatively low data transfer rate devices. SPI/I²C controller 250 is connected to mid plane 235 and thereby provides control commands from microcontroller 210 to modules 290, 295, 300 and other devices of the programmable multimedia controller 100. Further, connections from the SPI/I²C controller 250 are provided to devices such as a fan controller 251, a temperature sensor 252, and a power manager circuit 253, which collectively manage the thermal characteristics of programmable multimedia controller 100 and prevent overheating.

Microcontroller 210 is also connected to an Infra-Red (IR) interface 260, an RS232 interface 265, and a RF interface 267, each of which permits further interconnection with external devices. Also, a device control interface 275 is provided to communicate with lighting, home automation, and motor and/or relay operated devices. It is expressly contemplated that various other interfaces, including WI-FI, Bluetooth™, Zig-Bee™ and/or other wired and wireless interfaces, may be employed by programmable multimedia controller 100.

Finally, an expansion port 280 is provided for linking several programmable multimedia controllers 100 together, to form an expanded system, while a front panel display 285, for example a touch screen Liquid Crystal Display (LCD) display, is provided to display status, configuration, and/or other information to a user, as well as to accept user input.

Figure 3:
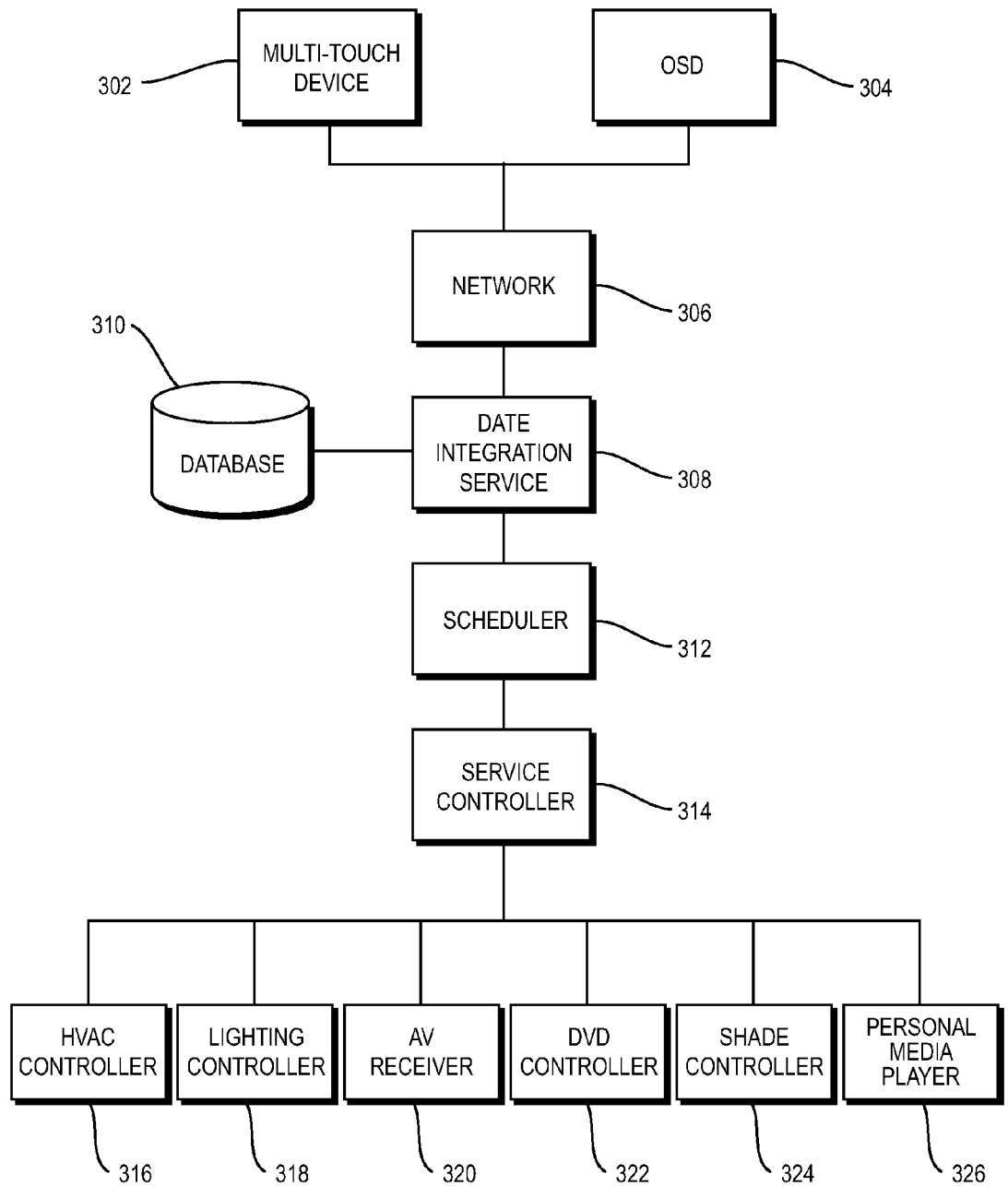
FIG. 3 is a functional block diagram of certain hardware components and software processes which may be involved in creating or modifying graphical schedules in accordance with a preferred embodiment of the present invention.

FIG. 3 is a functional block diagram of certain hardware components and software processes which may be involved in creating or modifying graphical schedules as described in detail below. A multi-touch device 302, which represents one type of user interface device that may be used in connection with the present invention, may be implemented with an iPod® Touch, iPhone® and iPad® from Apple Inc. (not shown). An on-screen display (OSD) 304, which represents an alternative type of user interface device that may be used in connection with the present invention, is described in the copending applications incorporated by referenced above. Yet another alternative type of user interface device would be a computer with a video monitor, keyboard and mouse (not shown).

A network process 306 provides the basic functionality to support both wired and wireless network communication with multi-touch device 302 and OSD 304. Information (user input) received from multi-touch device 302 and OSD 304 is passed by network process 306 to a data integration service 308. In general, data integration service 308 interprets commands received from multi-touch device 302 and OSD 304, stores data points and provides appropriate feedback (e.g., changes in screen appearance, sounds, etc.) to multi-touch device 302 and OSD 304. Data integration service 308 provides a generic engine for data manipulation and presentation with user interfaces. Among other functions, data integration service 308 may store data in, as well as retrieve data from, a database 310 or other suitable store. With respect to graphical schedules, data integration service 308 uses database 310 to store schedule points as described below.

A scheduler process 312 communicates with data integration service 308 and is capable of recognizing schedule points previously stored by that service. Once the current day (or date) or time, or both, match a stored schedule point, scheduler process 312 issues appropriate messages or commands to a service controller 314. Depending upon the action(s) to be taken, in accordance with a schedule previously created by a user, service controller 314 issues appropriate messages or commands to one or more devices such as HVAC controller 316, lighting controller 318, audio/video (AV) receiver 320, DVD controller 322, shade controller 324 and personal media player 326 which are controlled by a programmable multimedia controller 100 (FIG. 1).

Figure 4:
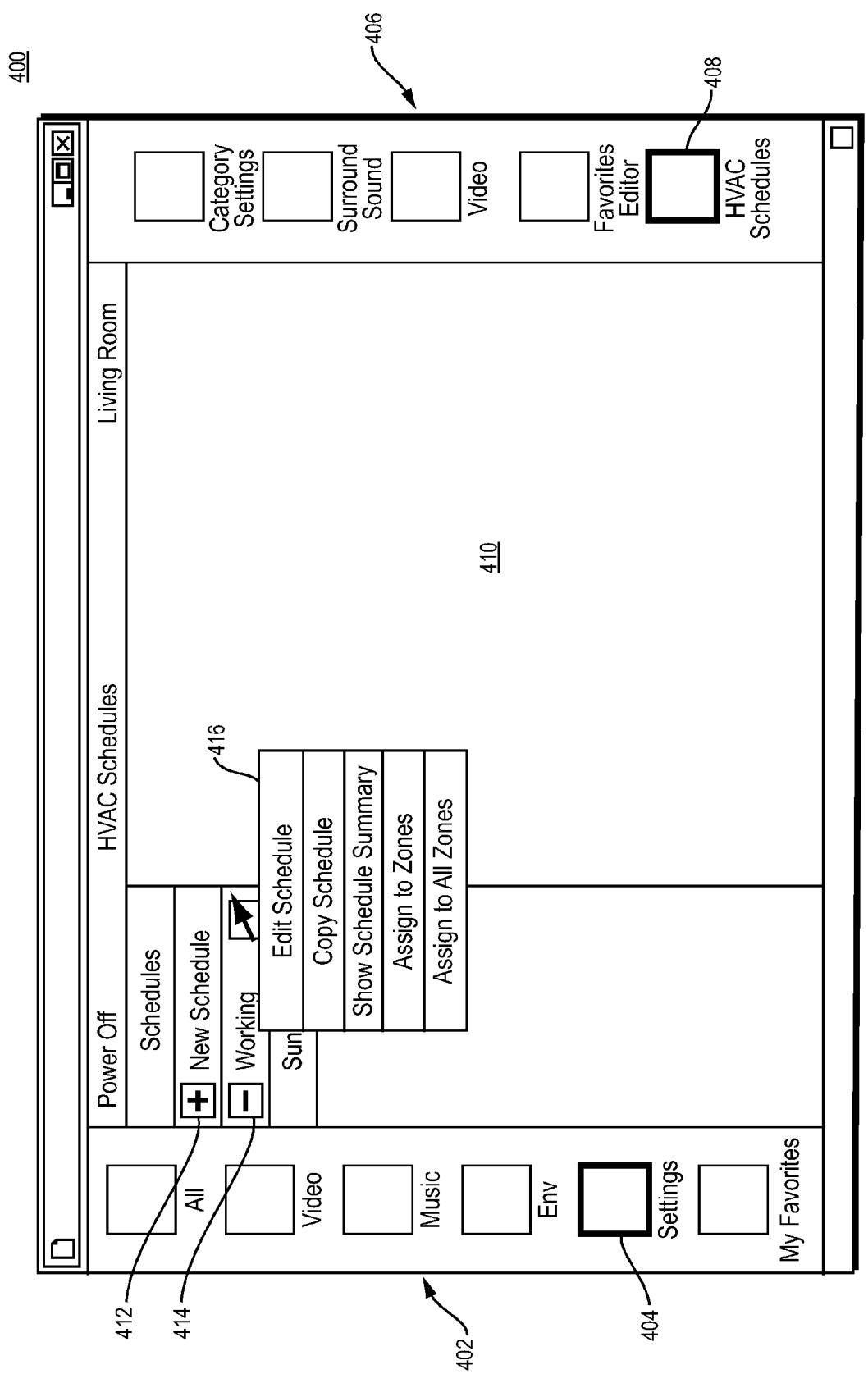
FIG. 4 is a main screen of a graphical user interface which enables a user to create and modify graphical schedules which are associated with devices controlled by the programmable multimedia controller of FIG. 1, in accordance with a preferred embodiment of the present invention.

FIG. 4 depicts a main screen 400 of a graphical user interface which enables a user to create and modify graphical schedules for devices controlled by programmable multimedia controller 100 of FIG. 1. User control buttons 402 enable a user to select a major category such as All, Video, Music, Env(ironmental), Settings and My Favorites. As indicated by a boldface border, a user has selected the Settings category by pressing button 404.

Within the Settings category, additional user control buttons 406 appear and these include Category Settings, Surround Sound, Video, Favorites Editor and HVAC Schedules. Again, as indicated by a boldface border, a user has selected HVAC Scheduling by pressing button 408. A workspace 410 is provided in which a graphical schedule may be displayed, as described below. By pressing a control button 412, a user may initiate the creation of a new graphical schedule for HVAC in workspace 410. Alternatively, by pressing a control button 414, a user may recall from persistent data storage (not shown) one or more existing or "working" graphical schedule(s) for HVAC.

With respect to any working graphical schedule, as shown in a popover menu 416, a user may choose among several possible actions with respect to that schedule. More specifically, popover menu 416 allows a user to edit or copy the working graphical schedule, to display a summary, to assign the working schedule to zones (e.g., particular rooms or portions of a home) or to assign the working schedule to all zones. Assume that a user wishes to edit an HVAC working graphical schedule and presses the Edit Schedule box in popover 416. This action will result in the HVAC working graphical schedule being retrieved from data storage and displayed in workspace 410 as shown in FIG. 5.

Figure 5:
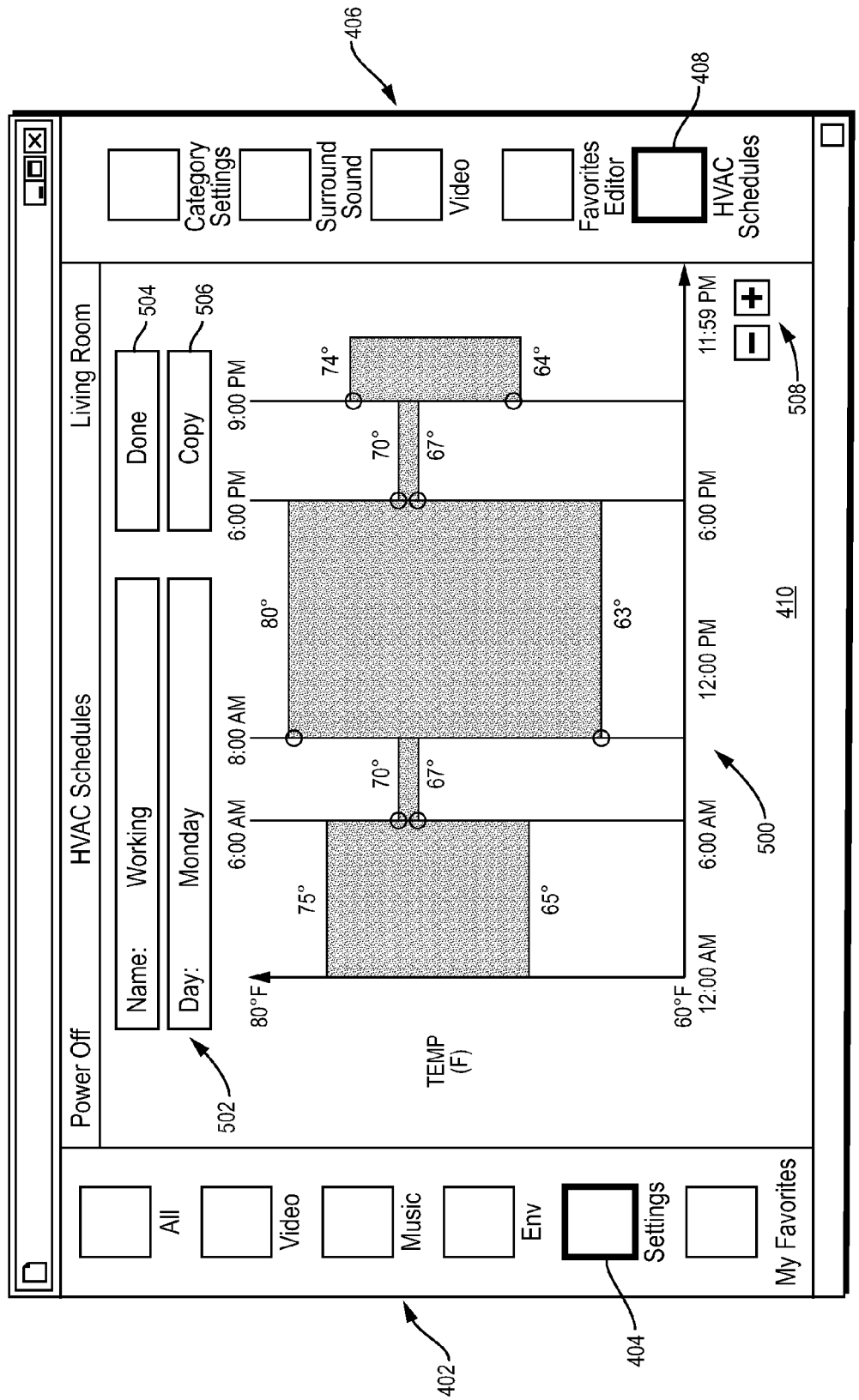
FIG. 5 is a screen of the graphical user interface showing an existing graphical calendar for HVAC that is available for editing.

In FIG. 5, HVAC working graphical schedule 500 is displayed in workspace 410. At the top of workspace 410, text boxes 502 identify the name (Working) of graphical schedule 500 and the day of week (Monday) to which it applies. When selected by a user, a popover menu (not shown) may appear to enable a user to change the day of week. A control button 504 (Done) may be pressed by a user when editing is complete. A control button 506 (Copy) may be pressed by a user and a popover menu (not shown) of copy options will appear. Copy options may include copying a graphical schedule from the previous day, copy the currently displayed graphical schedule to the next day, or copying the currently displayed graphical schedule to all weekdays, all weekend days or all days.

Graphical schedule 500 shows a 24 hour time of day along a horizontal axis and temperature along a vertical axis. For any given time, there are two temperatures. The higher temperature (e.g., 75° between 12:00 a.m. and 6:00 a.m.) represents a maximum temperature that must be reached before the HVAC system cools the room. The lower temperature represents a minimum temperature (e.g., 65° between 12:00 a.m. and 6:00 a.m.) that must be reached before the HVAC system heats the room. Control buttons 508 (−/+) enable a user to remove or add, respectively, schedule points to graphical schedule 500. When graphical schedule 500 is displayed on a touch-sensitive device, a user may easily and rapidly modify the temperatures or time boundaries with swipes or similar gestures. Alternatively, modifications may also be made through a user's interactions with an on-screen display, a keyboard, mouse or other user input device.

Figure 6:
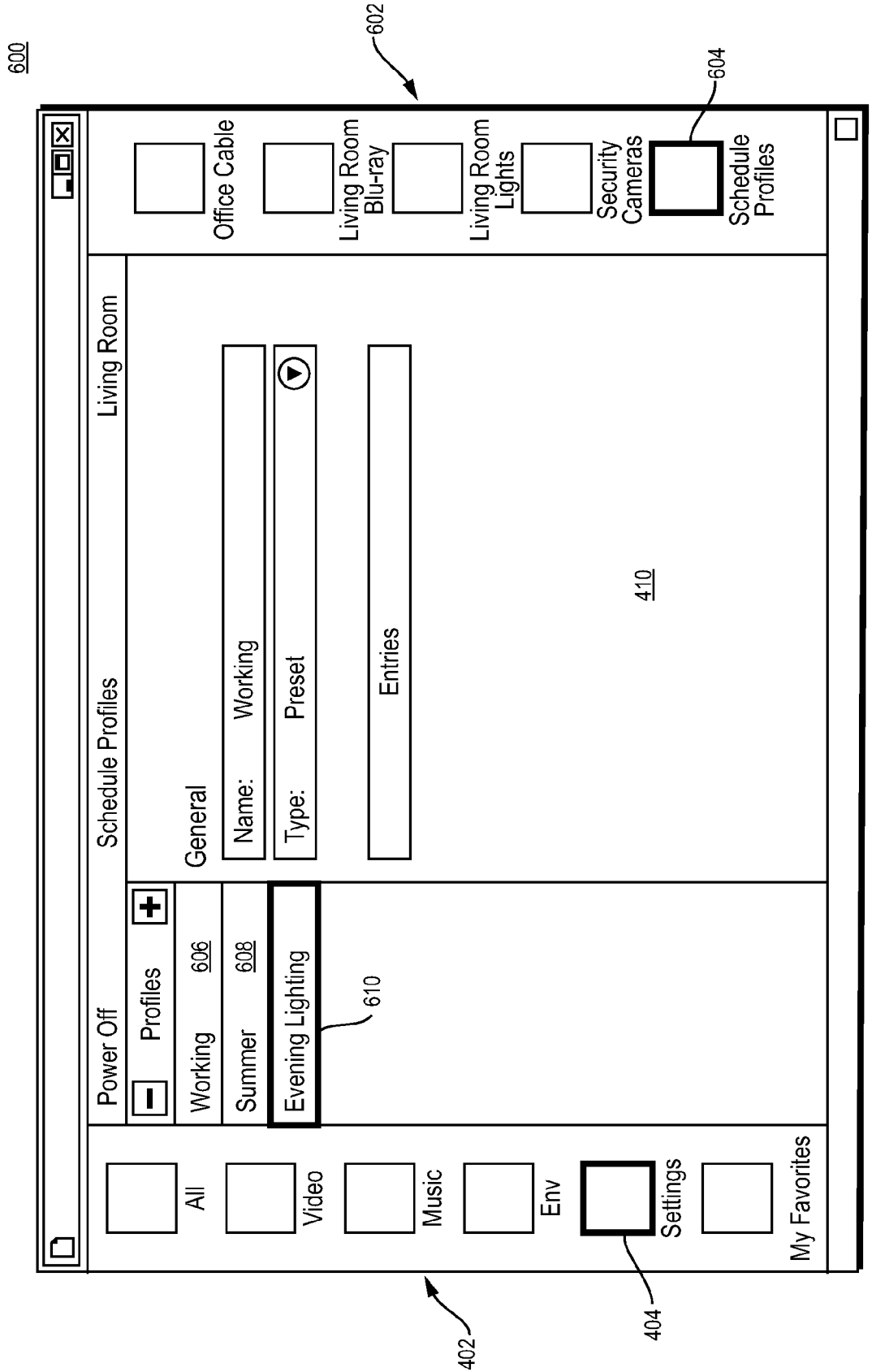
FIG. 6 is a main screen of a graphical user interface which enables a user to create and modify profiles and presets which are associated with devices controlled by the programmable multimedia controller of FIG. 1, in accordance with a preferred embodiment of the present invention.

FIG. 6 depicts a main screen 400 of a graphical user interface which enables a user to create and modify presets which are associated with devices controlled by programmable multimedia controller 100 of FIG. 1. User control buttons 402 enable a user to select a major category such as All, Video, Music, Env(ironmental), Settings and My Favorites. As indicated by a boldface border, a user has selected the Settings category by pressing button 404.

Within the Settings category, additional user control buttons 602 which correspond to various devices controlled by programmable multimedia controller 100. Specifically, control buttons 602 correspond, respectively, to Office Cable, Living Room Blu-ray, Living Room Lights and Security Cameras. As indicated by a boldface border, a user has selected Schedule Profiles by pressing button 604. Of three existing profiles listed as Working 606, Summer 608 and Evening Lighting 610, assume that a user wishes to view and possibly modify presets associated with the last. By selecting Evening Lighting 610, as indicated by the boldface border, this action will result in the presets associated with that profile being displayed as shown in FIG. 7.

Figure 7:
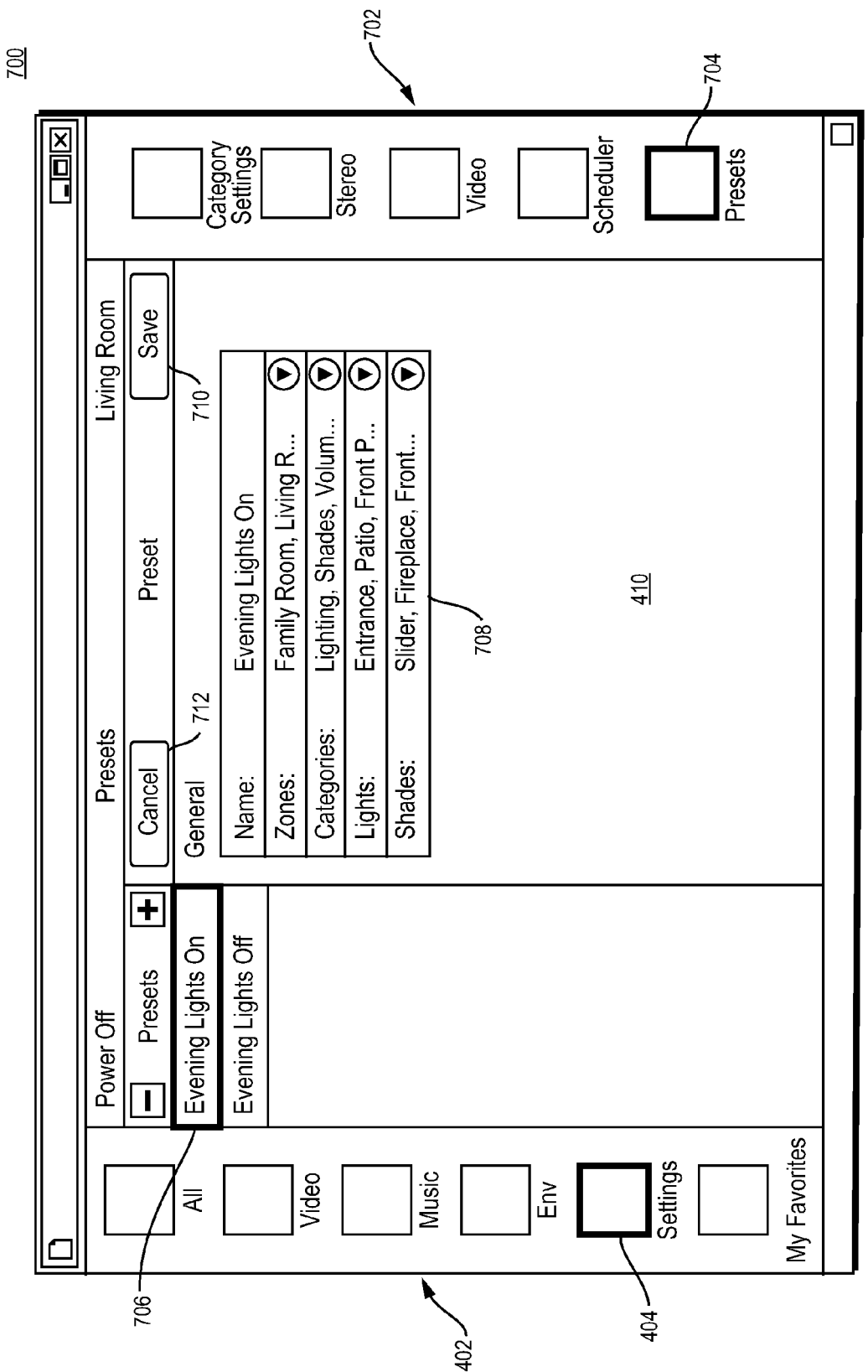
FIG. 7 is a screen of the graphical user interface showing existing presets for lighting control that are available for editing.

In FIG. 7, a different set of control buttons 702 are displayed. As indicated by a boldface border, a user has pressed control button 704 (Presets) in order to view and possibly modify a configuration of an Evening Lights On preset 706. In this example, Evening Lights On preset 706 operates to turn on certain lights, set the position of certain shades, and possibly perform other actions at a predetermined time in the evening. Thus, Evening Lights On preset 706 operates to create a user-selected environmental state for a predetermined physical space.

Shown in Evening Lights On preset configuration 708 are the name of the preset, the zones (i.e., physical space(s)) and service categories which are impacted by the preset's actions, the particular devices (i.e., individual lights and shades) that are impacted by the preset's actions. With the exception of the name of the preset, each other item shown in preset configuration 708 has a popover menu (not shown) which enables a user to modify the configuration. Once any desired modifications are complete, a user may press a Save button 710 in order to save the changes. If a user wished to discard the changes, he or she would press a Cancel button 712.

Figure 8:
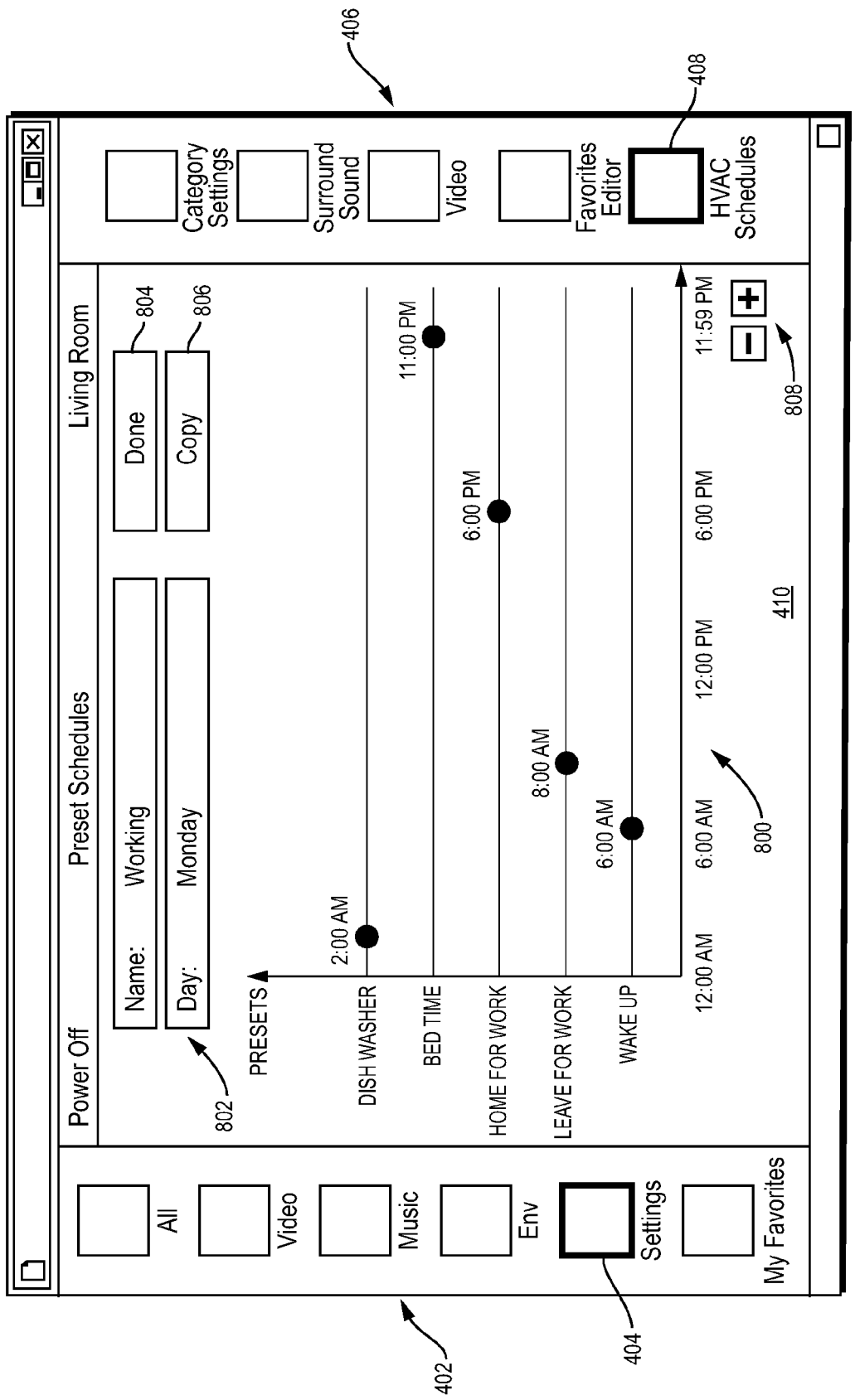
FIG. 8 is a screen of the graphical user interface showing an existing graphical schedule that is available for editing and which includes several presets.

In FIG. 8, a graphical schedule 800 which includes several presets is displayed in workspace 410 and is available for editing. At the top of workspace 410, text boxes 802 identify the name (Working) of graphical schedule 800 and the day of week (Monday) to which it applies. When selected by a user, a popover menu (not shown) may appear to enable a user to change the day of week. A control button 804 (Done) may be pressed by a user when editing is complete. A control button 806 (Copy) may be pressed by a user and a popover menu (not shown) of copy options will appear.

Graphical schedule 800 shows a 24 hour time of day along a horizontal axis and a total of five presets along a vertical axis. For example, a first preset named Dish Washer is scheduled to run at 2:00 a.m. A second preset named Bed Time is scheduled to run at 11:00 p.m. Control buttons 808 (−/+) enable a user to remove or add, respectively, presets to graphical schedule 800. When graphical schedule 800 is displayed on a touch-sensitive device, a user may easily and rapidly modify the scheduled times at which presets run with swipes or similar gestures. Alternatively, modifications may also be made through a user's interactions with an on-screen display, a keyboard, mouse or other user input device.

As an alternative, or in addition, to scheduling presets to run using a graphical calendar as described above, a user may assign a preset to a desired button in a user interface. In this fashion, a user may run a desired preset on demand by pressing the assigned button. Details regarding button assignment are provided in U.S. patent application Ser. No. 11/687,458 incorporated by reference above.

The foregoing description has been directed to particular embodiments of this invention. It will be apparent, however, that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A 1 method comprising:
providing a graphical user interface operable to
create or modify two or more presets, each preset representing a user selected environmental state for a predetermined physical space, said environmental state caused by a plurality of different types of devices taking actions defined by the preset, said plurality of different types of devices including two of more of audio/video (A/V) devices, lighting devices, heating ventilation and air conditioning (HVAC) devices, closed circuit television (CCTV) devices or motor-operated devices,
create a graphical schedule, said graphical schedule reflecting a relationship between time and said two or more presets, wherein said graphical schedule includes a first axis that indicates time and a second axis that indicates said two or more presets, and
in response to graphical manipulations by a user in said graphical user,
modify said graphical schedule to change when at least one of said two or more presets is scheduled to execute;
providing said graphical schedule and presets to a programmable multimedia controller which includes a general purpose computer and an interface for said plurality of different types of devices; and
using said programmable multimedia controller to control said plurality of different types of devices in accordance with said graphical schedule.

2. The method as in claim 1 wherein said graphical user interface is provided in connection with a touch-sensitive display.

3. The method as in claim 1 wherein said graphical 1 user interface is provided in connection with an on-screen display.

4. The method as in claim 1 wherein at least one of said presets defines a predetermined operational state that at least one device will enter in response to a command from said programmable multimedia controller.

5. The method of claim 1 further comprising:
changing a selected time at which at least one of said two or more presets is scheduled to run based on graphical manipulations from the user.

6. The method of claim 1 wherein said plurality of different types of devices include one or more electronic lighting controllers and said actions include turning on certain lights.

7. The method of claim 1 wherein said plurality of different types of devices include one or more motor operated device controllers and said actions include setting a position of certain shades.

8. The method of claim 1 wherein said plurality of different types of devices include a television and said actions include setting said television to a particular channel.

9. The method of claim 1 wherein said predetermined physical space is a room within a structure.

10. An apparatus comprising
a scheduler process configured to issue commands to devices in accordance with two or more presets and a graphical schedule, each preset representing a user selected environmental state for a predetermined physical space caused by a plurality of different type of devices taking actions defined by said preset, said plurality of different types of devices including two of more of audio/video (A/V) devices, lighting devices, heating ventilation and air conditioning (HVAC) devices, closed circuit television (CCTV) devices or motor-operated devices; and
a user interface device that includes a display device configured to show a graphical user interface, said graphical user interface operable to receive user input to create or modify said two or more presets,
display said graphical schedule to a user, the displayed graphical schedule to include a first axis that indicates time and a second axis that indicates said two or more presets, and
receive graphical manipulations from the user that indicate modifications to said graphical schedule.

11. The apparatus of claim 10 further comprising:
a general purpose computer configured to execute software processes,
wherein said software processes include said scheduler process.

12. The apparatus of claim 10 wherein said plurality of different types of devices include one or more electronic lighting controllers and said actions include turning on certain lights.

13. The apparatus of claim 10 wherein said plurality of different types of devices include one or more motor operated device controllers and said actions include setting a position of certain shades.

14. The apparatus of claim 10 wherein said plurality of different types of devices include a television and said actions include setting the television to a particular channel.

15. The apparatus of claim 10 wherein said predetermined physical space is a room within a structure.

16. The apparatus of claim 10 wherein said display device is a touch-sensitive display and said graphical manipulations from the user include swipes or gestures on the touch-sensitive display.

17. An apparatus comprising:
a general purpose computer configured to execute software processes;
means for causing a plurality of devices of different types to operate in accordance with two or more presets and a graphical schedule, each preset representing a user-selected environmental state for a predetermined physical space caused by devices taking actions defined by the preset, said devices including two of more of audio/video (A/V) devices, lighting devices, heating ventilation and air conditioning (HVAC) devices, closed circuit television (CCTV) devices or motor operated devices, said graphical schedule indicating a relationship 9 between time displayed on a first axis and said two or more presets displayed on a second axis; and
means for receiving user input to create or modify the two or more presets,
displaying the graphical schedule to the user, and receiving graphical manipulations from the user that indicate modifications to said graphical schedule.

18. A method comprising:
displaying a graphical user interface on a user interface device;
in response to user input from a user in the graphical user interface, create two or more presets, each preset representing a user-selected environmental state for a predetermined physical space within a structure caused by a plurality of different types of devices within the structure taking actions defined by the preset, the plurality of different types of devices including two of more of audio/video (A/V) devices, lighting devices, heating ventilation and air conditioning (HVAC) devices, closed circuit television (CCTV) devices or motor-operated devices;

showing a graphical schedule in said graphical user interface, said graphical schedule including a first axis that indicates time to which said two or more presets are mapped, and a second axis that represents said two or more presets, to graphically convey when each of said two or more presets is scheduled to execute;

in response to graphical manipulations in said graphical user interface by the user, modifying said graphical schedule to change when at least one of said two or more presets is scheduled to execute;

providing said modified graphical schedule to a programmable multimedia controller which controls said plurality of different types of devices; and using said programmable multimedia controller to control said plurality of different types of devices in accordance with said modified graphical schedule.

19. The method of claim 18 wherein said user interface device is a mobile device having a touch sensitive display and said graphical manipulations include swipes or gestures on said touch-sensitive display.

20. The method of claim 18 wherein said predetermined physical space is a room within said structure.

21. An apparatus comprising
a database configured to store schedule points;
a scheduler process configured to recognize schedule points stored in said database and issue commands in response to a current time matching a stored schedule point;
a service controller configured to receive said commands from the scheduler process and to issue commands to devices within a structure to change environmental state within the structure; and
a user interface device that includes a display device and is configured to:
display a graphical user interface on the display device,
in response to user input in said graphical user interface, create two or more presets, each preset representing two or more devices of different types taking actions defined by the preset to change environmental state in a predetermined physical space within the structure, the different types including two of more of audio/video (A/V) devices, lighting devices, heating ventilation and air conditioning (HVAC) devices, closed circuit television (CCTV) devices or motor-operated devices,
show a graphical schedule including a first axis that indicates time to which said two or more presets are mapped, and a second axis that represents said two or more presets, to graphically convey schedule points for each of the two or more presets, and
in response to graphical manipulations received in the graphical user interface from a user, modify said graphical schedule to change said schedule points of said two or more presets.

* * * * *

UNITED STATES PATENT AND TRADEMARK OFFICE
CERTIFICATE OF CORRECTION

PATENT NO. : 8,914,724 B2  Page 1 of 1
APPLICATION NO. : 13/081183
DATED : December 16, 2014
INVENTOR(S) : Cipollo et al.

It is certified that error appears in the above-identified patent and that said Letters Patent is hereby corrected as shown below:

In the claims:

Claim 1, Col. 9, line 13 should read:
A method comprising:

Claim 3, Col. 9, line 43 should read:
The method as in claim 1 wherein said graphic user Claim 17, Col. 10, line 54 should read:
said graphical schedule indicating a relationship Signed and Sealed this
Twenty-second Day of March, 2016

Michelle K. Lee
*Director of the United States Patent and Trademark Office*